(12) United States Patent
Ogawa et al.

(10) Patent No.: US 7,590,559 B2
(45) Date of Patent: Sep. 15, 2009

(54) INFORMATION PROVIDING SYSTEM FOR PROCESSING DATA IN ACCORDANCE WITH ORDER

(75) Inventors: Katsuhisa Ogawa, Tokyo (JP); Yoshio Yamashita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1360 days.

(21) Appl. No.: 10/254,572

(22) Filed: Sep. 26, 2002

(65) Prior Publication Data

US 2004/0078279 A1 Apr. 22, 2004

(30) Foreign Application Priority Data

Sep. 28, 2001 (JP) ............... 2001-301954

(51) Int. Cl.
*G06Q 30/00* (2006.01)
(52) U.S. Cl. ............... 705/26; 705/21; 705/50; 705/64; 705/77
(58) Field of Classification Search ............ 705/26
See application file for complete search history.

(56) References Cited

U.S. PATENT DOCUMENTS

| | | | | |
|---|---|---|---|---|
| 4,839,829 A | * | 6/1989 | Freedman | 715/751 |
| 5,666,215 A | * | 9/1997 | Fredlund et al. | 358/487 |
| 5,745,883 A | * | 4/1998 | Krist et al. | 705/34 |
| 6,064,838 A | * | 5/2000 | Maruta et al. | 399/79 |
| 6,133,985 A | | 10/2000 | Garfinkle et al. | 355/40 |
| 6,343,284 B1 | * | 1/2002 | Ishikawa et al. | 705/67 |
| 6,415,277 B1 | * | 7/2002 | Klatt et al. | 707/1 |
| 6,429,923 B1 | * | 8/2002 | Ueda et al. | 355/40 |
| 6,618,566 B2 | * | 9/2003 | Kujirai et al. | 399/79 |
| 6,657,702 B1 | * | 12/2003 | Chui et al. | 355/40 |
| 7,016,059 B1 | * | 3/2006 | Baum et al. | 358/1.15 |
| 2001/0002204 A1 | | 5/2001 | Jebens et al. | 375/240.01 |

FOREIGN PATENT DOCUMENTS

| | | |
|---|---|---|
| EP | 0 856 972 | 8/1998 |
| EP | 1 075 138 | 2/2001 |
| EP | 1 107 534 | 6/2001 |
| EP | 1 107 569 | 6/2001 |
| EP | 1134650 A2 * | 9/2001 |

OTHER PUBLICATIONS

U.S. Appl. No. 10/254,509, filed Sep. 26, 2002.
U.S. Appl. No. 10/254,675, filed Sep. 26, 2002.

* cited by examiner

*Primary Examiner*—F. Zeender
*Assistant Examiner*—Paul Danneman
(74) *Attorney, Agent, or Firm*—Fitzpatrick, Cella, Harper & Scinto

(57) ABSTRACT

This invention provides an information processing system which executes settlement processing for a plurality of orders all at once. To implement this system, an estimated amount is calculated by estimate calculation modules (115A-115C) for each order received at a printsite (113). A plurality of calculated estimated amounts are received by a photosite (107) and totalized to calculate the charge amount, and charge amount settlement is requested.

12 Claims, 12 Drawing Sheets

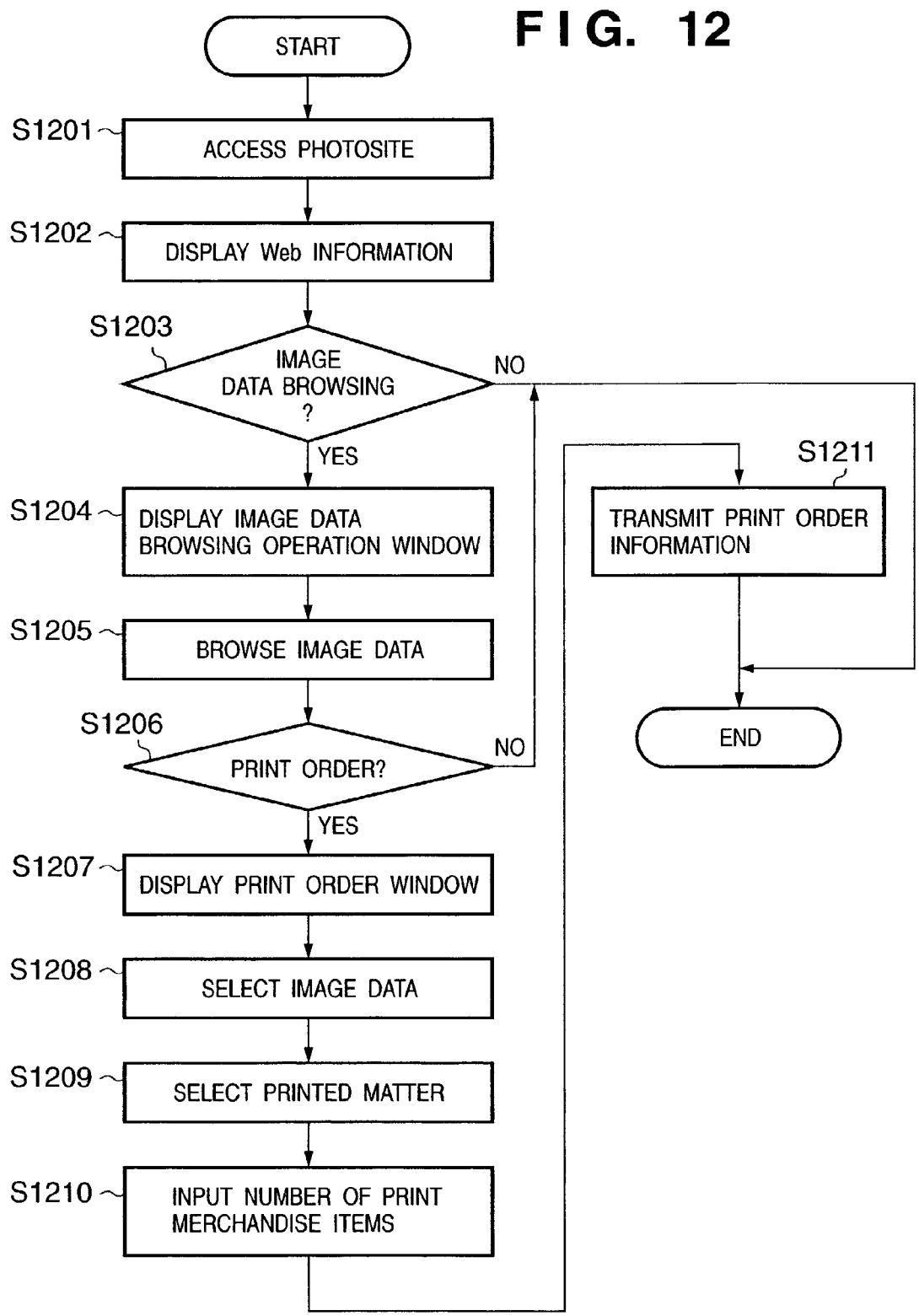

INFORMATION PROVIDING SYSTEM FOR PROCESSING DATA IN ACCORDANCE WITH ORDER

FIELD OF THE INVENTION

The present invention relates to an information providing system which receives an order for data processing, processes data whose processing has been ordered, and requests settlement of the fee of processing.

BACKGROUND OF THE INVENTION

Recently, with improvements in communication infrastructures and advances in information communication techniques, information providing services and information using services which use, e.g., the Internet can be provided. In multimedia environments in which all data, e.g., text data, image data, and sound data, are digitized, in particular, many information providing services of processing data in accordance with orders have been offered.

At the same time, with smooth decreases in semiconductor device size, the part sizes and costs of LSIs and solid-state image sensing elements which constitute image input devices represented by digital still cameras and digital video cameras have been scaled down. As a consequence, these image input devices have widely permeated through customers as electronic devices for photographing images. Image data photographed by a customer who has bought a digital camera is stored in a memory inside the digital camera. The data is then transferred to a recording unit such as an HDD in a personal computer owned by the customer and managed/stored or is written in an external storage medium such as a CD-R and stored.

Not only images obtained by digital cameras but also those read by color scanners can also easily be converted into digital image data and stored.

With such rapid improvements in the Internet and image input devices, there have appeared application service providers (to be referred to as photosites hereinafter) which provide services like keeping image data photographed by customers using digital cameras in storage areas in servers on the Internet and allowing the customers to browse the image data again at the time they require it.

There have also appeared print service providers (to be referred to as printsites hereinafter) which provide services of accepting print orders by causing customers to transfer electronic documents such as the New Year's cards, wordprocessed documents, and images using the Internet and providing, as merchandise, printed matter obtained by printing these electronic documents to the customers.

There are also settlement agent sites which execute, for printsites or photosites, settlement processing necessary for collecting charges for merchandise purchased by customers in electronic commerce on the Internet and obtain commissions.

However, in conventional information providing systems, data processing and charge settlement necessary for it are executed for each order, resulting in cumbersome procedures for users.

For example, assume that a customer wants a plurality of kinds of print merchandise from one image data in a system including the printsites, photosites, and settlement agent sites. If the customer wants to print certain image data on, e.g., New Year's cards (a service provided by a printsite A) or on T-shirts (a service provided by a printsite B), he/she must give a print order to each of the printsites that provide the desired print merchandise, resulting in time-consuming procedures.

Also, in this case, since settlement processing is executed for each printsite, a commission must be paid to a settlement agent site every time, resulting in high cost. Moreover, since information about customer's privacy and, particularly, important personal information such as the number of a credit card to be used for the settlement processing is transferred every time settlement processing is executed, the security is inadequate.

In addition, even when print orders are placed a plurality of number of times during a period, settlement processing is executed every time an order is placed. Hence, the customer must pay the commissions many times during the settlement processing period.

Furthermore, users desire to reduce commissions by paying when the amount or the number of orders has reached a good sum instead of executing settlement processing for each print order.

SUMMARY OF THE INVENTION

The present invention has been made to solve the above problems, and has as its object to provide an information providing system which can execute settlement processing for user's orders all at once, an information processing apparatus, a control method therefore, a control program, and a storage medium.

In order to achieve the above object, according to the present invention, there is provided an information providing system including a first information processing apparatus and a second information processing apparatus, wherein the first information processing apparatus comprises:

accept means for accepting an order to execute data processing;

calculation means for calculating an amount necessary for the data processing in accordance with the order accepted by the accept means; and notification means for notifying the second information processing apparatus of the amount calculated by the calculation means, and the second information processing apparatus comprises:

reception means for receiving a plurality of amounts from the notification means;

totalizing means for totalizing the amounts received by the reception means; and settlement request means for requesting settlement of the amount totalized by the totalizing means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 12 is a flow chart for explaining the operation of the user PC in browsing an image in the first embodiment of the present invention.

DETAILED DESCRIPTION OF THE PREFERRED EMBODIMENTS

First Embodiment

Preferred embodiments of the present invention will be described below in detail with reference to the accompanying drawings.

Figure 1:
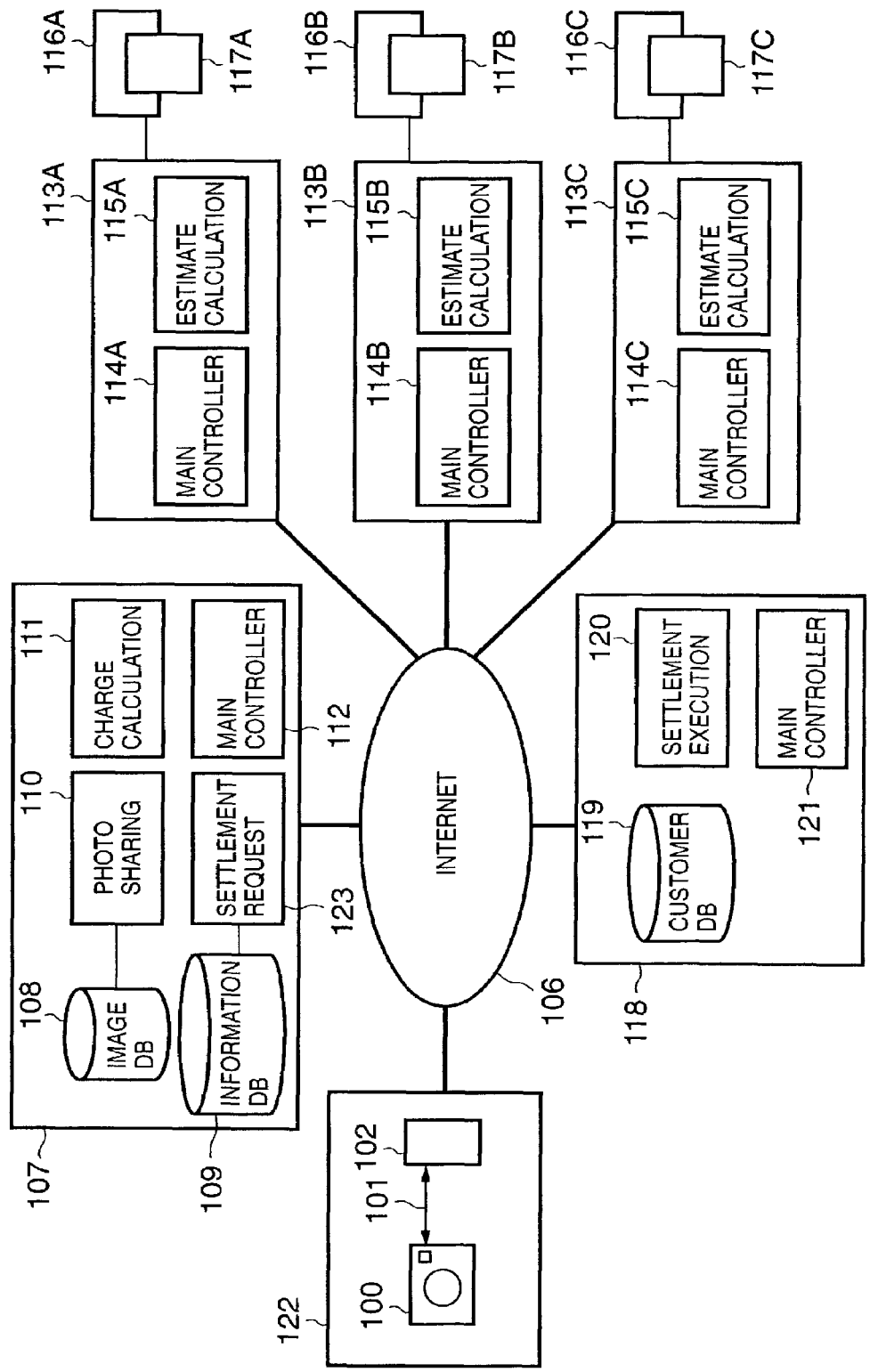
FIG. 1 is a block diagram showing a system configuration according to the first embodiment of the present invention.

FIG. 1 is a block diagram for explaining a system according to the first embodiment of the present invention.

Reference numeral 100 denotes an image input apparatus which is, for example, a digital still camera capable of photographing still images and recording the images as still image data or a digital video camera capable of photographing moving images and recoding images as moving image data. The image input apparatus 100 converts an optical image as image information into an electrical signal, performs predetermined image processing, and then records/reproduces the signal as digital information. Reference numeral 102 denotes a user personal computer (to be referred to as a user PC hereinafter); and 101, a data transfer interface for transferring image data photographed between the image input apparatus 100 and the user PC 102. The data transfer interface 101 may be a wire interface represented by USB (Universal Serial Bus) or IEEE1394 or a wireless interface represented by IrDA (Infrared Data Association) or Bluetooth.

The image data photographed by the image input apparatus 100 and stored as digital information is transferred to a storage area in an information storage unit represented by the HDD (Hard Disc Drive) of the user PC 102 through the data transfer interface 101. For image data transfer from the image input apparatus 100 to the user PC 102, the following two cases are present. In the first case, in accordance with an instruction from the OS or dedicated software installed in the user PC 102, the image data stored in the image input apparatus 100 are transferred at once. In the second case, in response to the instruction of a transfer command from the image input apparatus 100, the OS or dedicated software in the user PC 102 ensures a data recording area in the information storage unit in the user PC 102 and transfers the image data to the area.

A browser (not shown) having a standard protocol capable of transmitting information on the Internet 106 can run on the user PC 102. With this browser, a user can access a site on the Internet 106 using the standard protocol such as HTTP protocol to display Web information created by a description language such as HTML or XML. Web information is linked to multimedia information such as images or sounds managed by sites on the Internet 106. With this operation, a customer 122, i.e., the user of the user PC 102 can receive services provided by various sites using the Internet 106.

Image data stored in the information storage unit in the user PC 102 is transferred to a photosite 107 (to be described later) in accordance with a request from the customer 122 (this transfer will be referred to as image upload hereinafter). Methods of uploading an image include a method in which image data to be transferred is selected using the above browser and transferred in synchronism with the action of requesting image upload and a method in which image data is directly selected and transferred by using image upload software. Either method is executed on the basis of a protocol usable on the Internet, e.g., HTTP or FTP.

Reference numeral 107 denotes an application service provider (to be referred to as a photosite hereinafter) which provides a service of storing image data photographed by the image input apparatus 100 of the customer 122 in an image DB (DataBase) 108 and making the customer 122 browse the image data stored in the image DB 108 at the time he/she requires it. Reference numeral 110 denotes a photo sharing module which executes the above series of image upload operations at the photosite 107. The photo sharing module 110 checks whether uploaded image data is data that can be used in the photosite 107. Upon determining that the data can be used, the photo sharing module 110 stores the uploaded image data in the image DB 108, and the attribute information and the like of the image data in an information DB 109. In addition, at this time, the photo sharing module 110 notifies the user PC 102 that the image data has been properly uploaded. The customer 122 can browse image data designated from the image data uploaded in this manner through the browser.

The photosite 107 may put a plurality of uploaded image data into one unit and manage it as an album for browsing. In the information DB 109, in addition to the attribute information of the image data described above, various data are unitarily managed, which include, e.g., the attribution information of users registered in the photosite 107, the attribute information of print service providers 113 (to be referred to as printsites 113 hereinafter) who request the printing out of uploaded image data, and the like.

A charge calculation module 111 is a module which calculates the charge amount for a print order to the customer 122 (to be described later). A main controller 112 controls a series of processes in the photosite 107.

The photosite 107 places an order with a print service provider (to be referred to as a printsite hereinafter) that provides image data printing as a solution for printing of image data uploaded from the user PC 102. Hence, the customer 122 can order print merchandise by only selecting image data to be printed to make merchandise, one or plurality of merchandise items (e.g., New Year's cards provided by the printsite 113A, mug printing provided by the printsite 113B, T-shirt printing provided by the printsite 113C, and the like) provided by printsites 113A, 113B, and 113C from the image browsing window received from the photosite 107.

The print providers are the printsites 113A, 113B, and 113C. For the sake of illustrative convenience, only the three printsites are illustrated. However, the number of printsites is not specifically limited and may be four or more. Reference numerals 114A to 114C denote main controllers which control processing in the printsites 113A to 113C and their units; 115A to 115C, estimate calculation modules which calculate the estimated price of print merchandise on the basis of a print order from the photosite 107; and 116A to 116C, printing apparatuses which execute requested image data print processing. The printing apparatuses 116A to 116C can be laser beam printers, inkjet printers, textile printing apparatuses, printing presses, and the like. Reference numerals 117A to 117C denote pieces of print merchandise on which image data are printed using the printing apparatuses 116A to 116C.

Reference numeral 118 denotes a settlement agent site 118 which executes, on behalf of the photosite 107, settlement processing necessary for collecting charges for print merchandise purchased by the customer 122 in electronic commerce on the Internet 106 and obtains commissions; 119, a customer database which stores customer attribute information (the name, address, date of birth, recognition ID, and the like of the customer 122) related to customers or their settlement processing handeled by the settlement agent site 118; 120, a settlement execution module which executes settlement for the customer 122; and 121, a main controller which controls processing in the settlement agent site 118 and its units.

Figure 10:
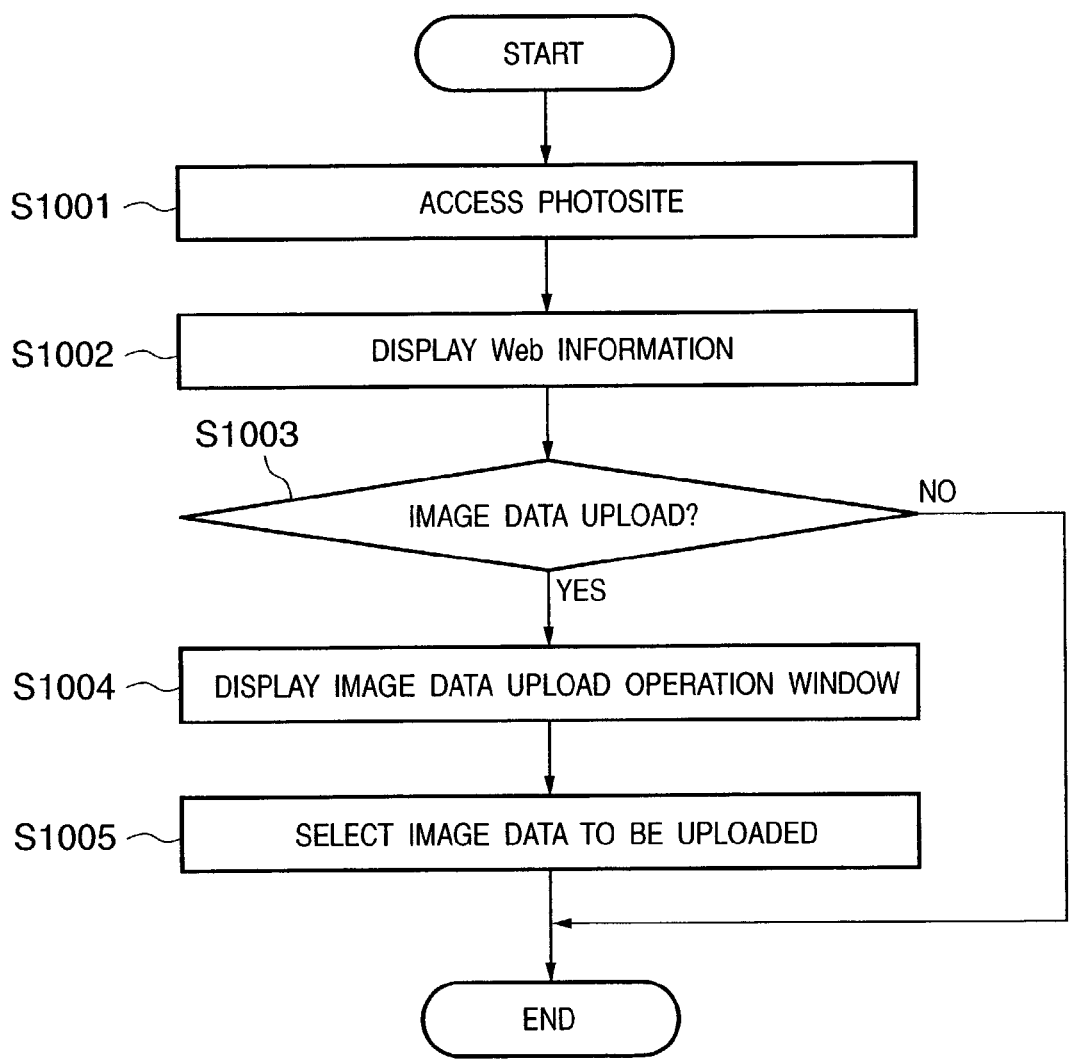
FIG. 10 is a flow chart for explaining the operation of a user PC in uploading an image in the first embodiment of the present invention.
Figure 11:
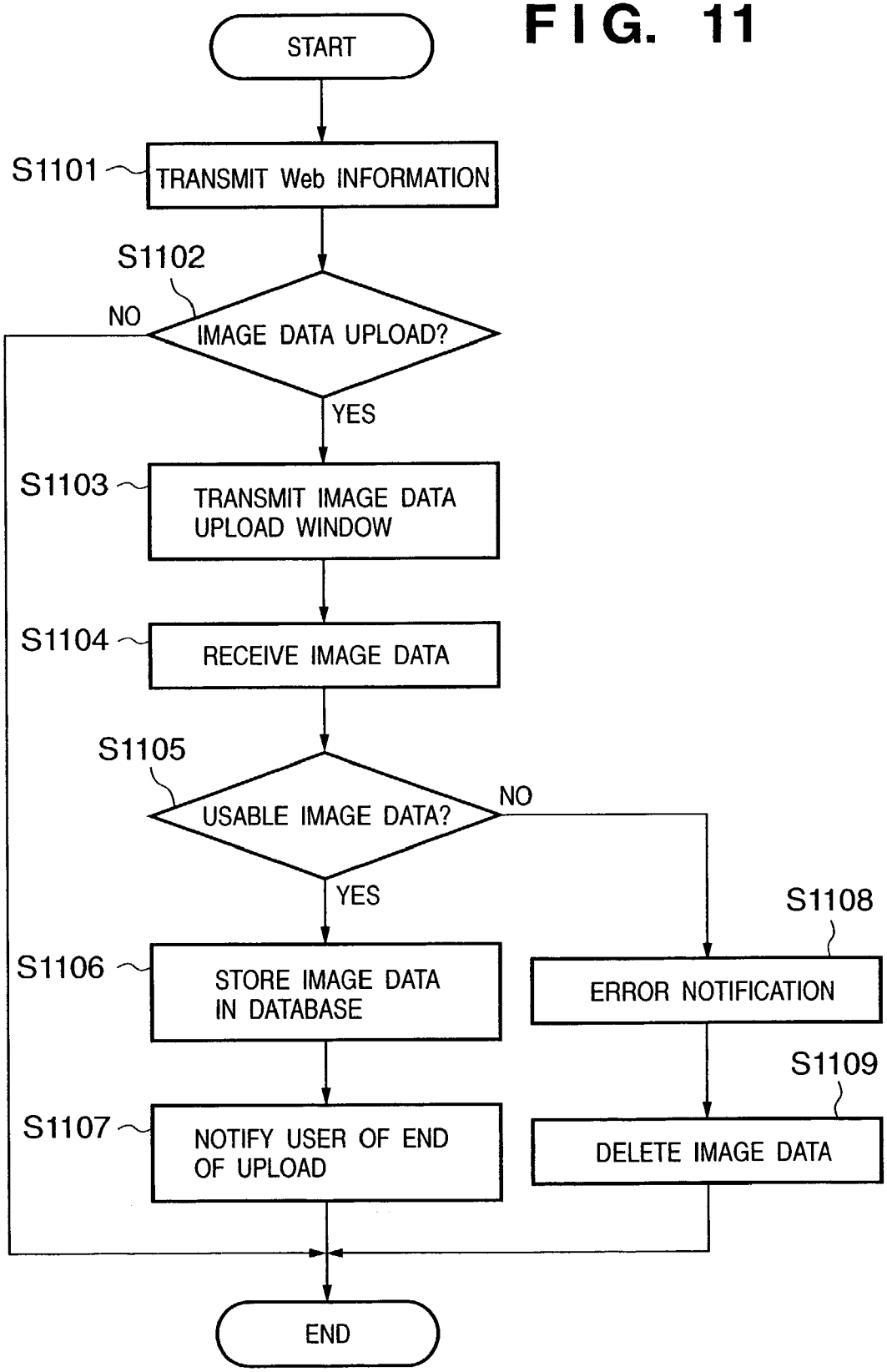
FIG. 11 is a flow chart for explaining the operation of a PC at a photosite in uploading an image in the first embodiment of the present invention.

A procedure for uploading image data transferred from the image input apparatus 100 to the user PC 102 to the photosite 107 through the Internet 106 will be described with reference to FIGS. 10 and 11.

Operation of causing the user PC 102 to upload image data to the photosite 107 will be described below with reference to FIG. 10.

Step S1001:
The user PC 102 operates the browser to access the photosite 107.

Step S1002:
The user PC 102 displays Web information of the photosite 107 on the browser.

Accordingly, the customer 122 can receive services provided by the photosite 107 by operating the user PC 102.

Step S1003:
The user PC 102 inputs a service to be used from the Web information displayed in step S1002.

Step S1004:
When the "image data upload" service is input in step S1003, an operation window (upload window) which is used to upload image data photographed by the image input apparatus 100 and stored in the information storage area (not shown) in the user PC 102 is displayed on the browser of the user PC 102.

Step S1005:
Image data to be uploaded is selected and transferred by operating the upload window displayed on the browser of the user PC 102.

Thus, the operation is ended.

In this way, the customer 122 can upload image data to the photosite 107 using the browser of the user PC 102.

Operation of causing the photosite 107 to upload the image data in the user PC 102 will be described below with reference to FIG. 11.

Step S1101:
Upon receiving a request from the user PC 102, the photosite 107 transmits Web information to the user PC 102.

Step S1102:
The photosite 107 discriminates the service type input from the user PC 102.

Step S1103:
If the service type is discriminated as the "image data upload" service in step S1102, the photosite 107 transmits the upload window.

Step S1104:
The photo sharing module 110 receives image data transferred from the user PC 102.

Step S1105:
The photo sharing module 110 checks whether the image data received in step S1104 is data that can be used in the photosite 107.

Step S1106:
If it is determined in step S1105 that the image data is usable data, the photosite 107 stores the image data in the image DB 108.

In addition, the size of the image data and the attribute information of the image data such as a compression format are also stored in correspondence with user attribute information that is registered in advance in the information DB 109.

Step S1107:
When processing in step S1104 is ended, the photo sharing module 110 notifies the user PC 102 that the image data has been properly uploaded.

The operation is ended.

Step S1108:
If it is determined that the received image data is unusable, the photo sharing module 110 notifies the user that the uploaded image data cannot be used in the photosite 107 (error notification).

Step S1109:
The photosite 107 deletes the image data transferred from the user PC 102.

The operation is ended.

A procedure for causing the user PC 102 to order print merchandise from the photosite 107 using the uploaded image data will be described with reference to FIG. 12.

Step S1201:
The user PC 102 operates the browser to access the photosite 107.

Step S1202:
The user PC 102 displays Web information of the photosite 107 on the browser.

Accordingly, the customer 122 can receive services provided by the photosite 107 by operating the user PC 102.

Step S1203:
The user PC 102 inputs a service to be used from the Web information displayed in step S1202.

Step S1204:
When the "image data browsing" service is input in step S1203, an operation window (browsing window) which is used to browse image data stored in the image DB 108 of the photosite 107 is displayed on the Web browser of the user PC 102.

Step S1205:
In the user PC 102, image data are displayed on the Web browser by operating the browsing window displayed in step S1204. The image data may sequentially be displayed one by one. If a plurality of image data are registered as one album, the plurality of image data contained in that album can be browsed at once. Alternatively, the image data may be displayed as thumbnail images, and the customer 122 can display an enlarged view of desired image data selected with reference to the thumbnail images.

Step S1206:

The user PC 102 inputs a print order for the image data browsed in step S1205.

Step S1207:

A "print order window" that is used to place a print order is displayed on the browser of the user PC 102.

Step S1208:

In the user PC 102, image data whose print order should be given is selected by operating the print order window displayed in step S1207.

Step S1209:

A type of printed matter (New Year's, mugs, T-shirts, or the like) on which the image data is to be printed is selected by operating the print order window displayed on the user PC 102 in step S1207.

Step S1210:

The number of ordered merchandise items is input by operating the print order window displayed on the user PC 102 in step S1207.

Step S1211:

Print order information containing the image data selected in step S1208, the type of printed matter selected in step S1209, and the number of merchandise items input in step S1210 is transmitted to the photosite 107.

Thus, the operation is ended.

In the above description, the PC is used as a terminal used to upload image data. However, the present invention is not limited to this. Image data may be uploaded from a communication apparatus such as a cell phone having an information processing function and image input function, or an image input apparatus such as a digital still camera, digital video camera, scanner, and copying machine.

[Data Flow]

Figure 2:
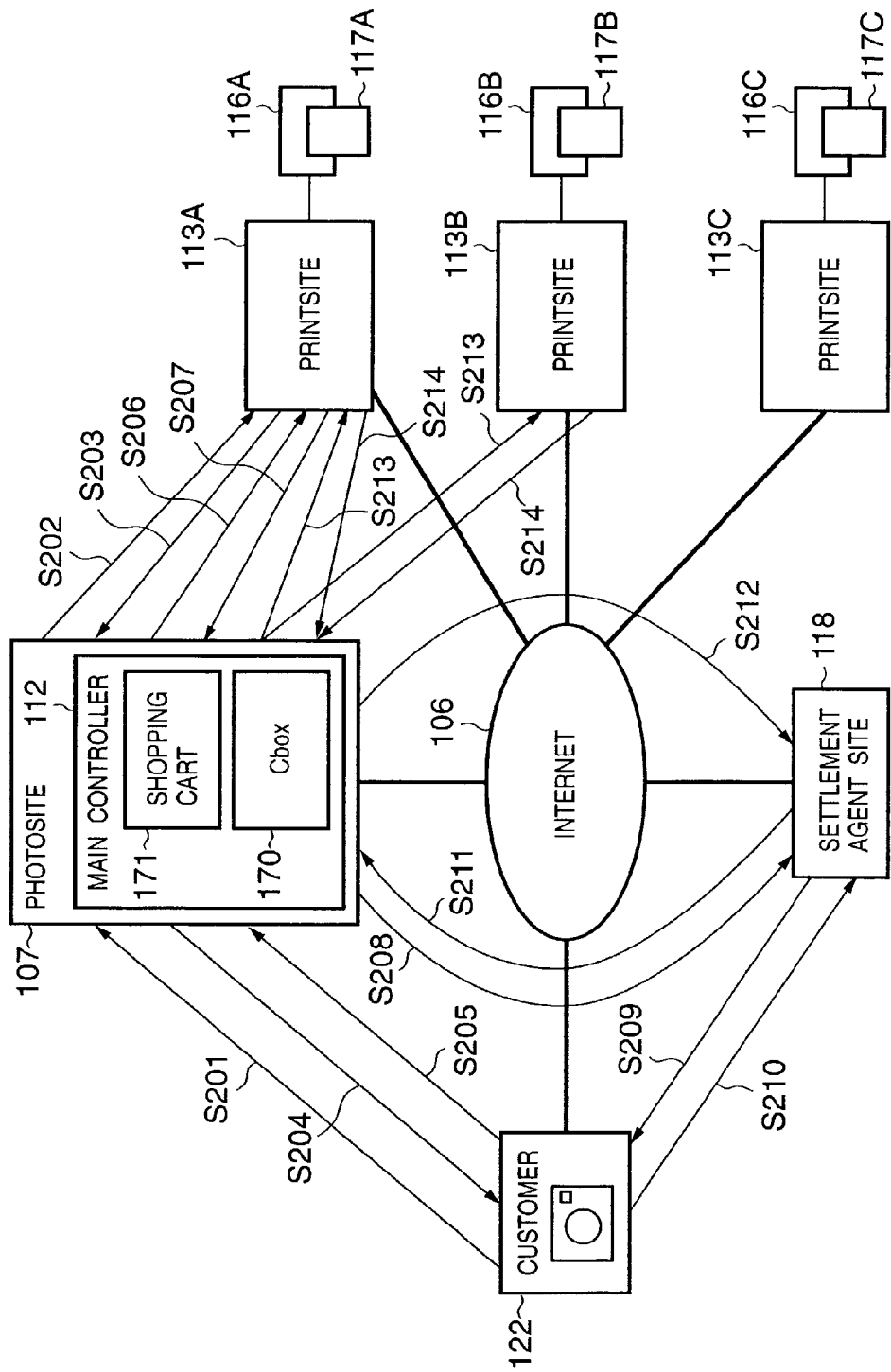
FIG. 2 is a block diagram showing the processing flow in the first embodiment of the present invention.

The data flow in this system will be described next with reference to FIG. 2. FIG. 2 is a block diagram showing the general idea of this system.

In the photosite 107, the list of print merchandise provided by the plurality of printsites 113 is unitarily controlled by a shopping cart module 171. Hence, the user PC 102 can order print merchandise items provided by the plurality of printsites 113 at once by accessing the photosite 107.

In the photosite 107, additionally, charges to be paid by the customer 122 for the merchandise items of the plurality of printsites 113 are unitarily managed by a cash charge box 170 (to be referred to as a CBox hereinafter). Hence, when the user have placed orders with the plurality of printsites 113 at once, settlement processing for the print merchandise items can be executed at once.

Each step of the data flow shown in FIG. 2 will be described next.

Step S201:

The user PC 102 places print orders with the photosite 107 for "New Year's card" and "T-shirt" as print merchandise.

Step S202:

In accordance with the list in the shopping cart module 171, the photosite 107 issues temporary print orders to the printsites 113A and 113B corresponding to the print merchandise items (New Year's cards and T-shirts) ordered by the user PC 102, thereby requesting estimation. Note that in the shopping cart 171, print merchandise items (printed matters), names, and URL addresses of the printsites are stored as a list in correspondence with each other. For example, "New Year's card" is stored in correspondence with the printsite A and "http://www.XXX.○○.co.jp".

Step S203:

The estimate calculation modules 115A and 115B in the printsites 113A and 113B execute estimation requested by the photosite 107 and calculate estimated amounts. The printsites 113A and 113B transmit the estimated amounts to the photosite 107.

The photosite 107 stores the transmitted estimated amounts in the CBox 170.

Step S204:

Upon receiving the estimated amounts from all the printsites (printsites 113A and 113B), the charge calculation module 111 in the photosite 107 totalizes the estimated amounts of the printsites 113A and 113B, which are stored in the CBox 170, and adds the necessary expense and profit to the sum, thereby calculating the charge amount. The photosite 107 transmits the charge amount to the user PC 102.

Step S205:

The user PC 102 displays, on the display or the like, the charge amount transmitted from the photosite 107 in step S204. On the basis of this charge amount, the customer 122 determines whether he/she should decide the print orders. If the customer 122 agrees with the charge amount and decides the print orders, the user PC 102 notifies the photosite 107 of approval of print orders.

Step S206:

Upon receiving the approval of print orders from the user PC 102, the photosite 107 issues formal print orders to the printsites 113A and 113B.

Step S207:

The photosite 107 receives shipment complete notifications for the pieces of print merchandise A and B from the printsites 113A and 113B.

Step S208:

When the photosite 107 receives the shipment complete notifications from the printsites 113A and 113B, the settlement request module 123 in the photosite 107 transmits to the settlement agent site 118 the customer attribute information (the name, date of birth, recognition ID, and the like of the customer) of the customer 122 and the charge amount for the customer 122, thereby requesting the settlement agent site 118 to execute settlement processing on behalf of the photosite 107.

Step S209:

The settlement execution module 120 in the settlement agent site 118 notifies the user PC 102 of the charge amount to bill the customer 122.

Step S210:

The customer 122 pays the bill to the settlement agent site 118 until the due date.

Step S211:

The settlement agent site 118 pays to the photosite 107 the bill paid by the customer.

Step S212:

The photosite 107 pays the settlement agency commission to the settlement agent site 118.

Step S213:

The photosite 107 pays the charges for merchandise to the printsites 113A and 113B.

Step S214:

The printsites 113A and 113B pay introduction charges to the photosite 107.

Figure 3:
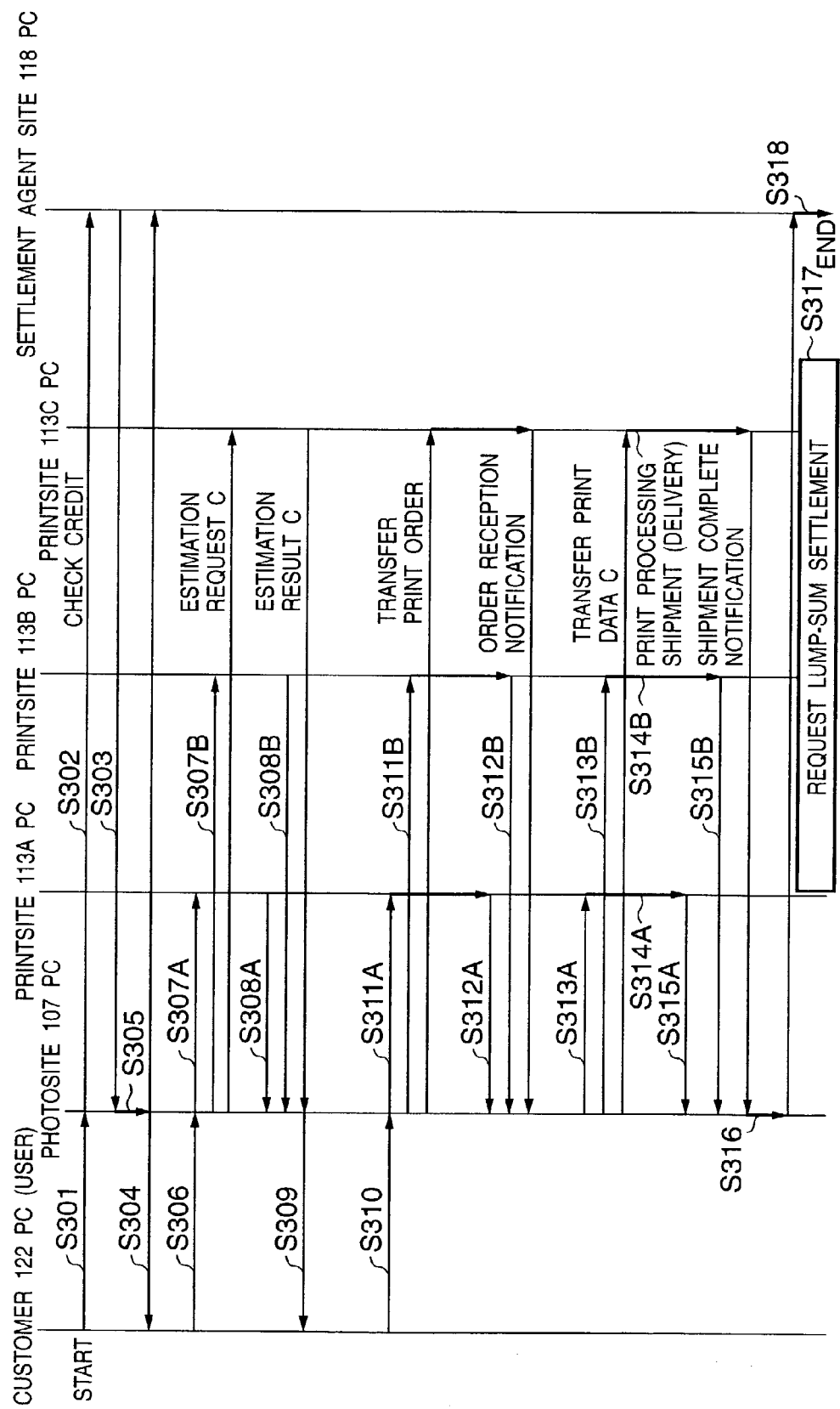
FIG. 3 is a chart showing the processing flow between PCs according to the first embodiment of the present invention.

FIG. 3 is a chart showing the processing flow between the user PC 102, photosite 107, printsites 113, and settlement agent site 118 according to this embodiment.

Step S301:

The user PC 102 transmits to the photosite 107 credit information such as a credit card number necessary for settlement processing together with the personal attribute information of the customer 122.

Step S302:

The photosite 107 transfers the personal attribute information and credit information of the customer 122 to the settlement agent site 118 and requests the settlement agent site 118 to confirm the credit.

Step S303:

The settlement agent site 118 confirms the solvency of the customer 122 on the basis of the received personal attribute information and credit information of the customer 122 and notifies the photosite 107 of the credit check result.

Step S304:

When notified by the settlement agent site 118 that the customer 122 has solvency, the photosite 107 registers the customer 122 as a user.

The photosite 107 issues a recognition ID to the user PC 102. Then, the customer 122 can use the service of the photosite 107 using the recognition ID.

Step S305:

The photosite 107 also issues a unique customer recognition ID to the settlement agent site 118 such that it can recognize the customer 122. The settlement agent site 118 stores the issued customer recognition ID in the customer DB 119.

Step S306:

The customer 122 registered in the photosite 107 as a user gives print orders for "New Year's cards" and "T-shirts" as print merchandise items to the photosite 107 using the user PC 102.

Steps S307A and S307B:

In accordance with the list in the shopping cart 171, the photosite 107 issues temporary print orders to the printsites 113A and 113B corresponding to the print merchandise items (New Year's cards and T-shirts) ordered by the user PC 102, thereby requesting estimation.

Steps S308A and S308B:

The estimate calculation modules 115A and 115B in the printsites 113A and 113B estimate the ordered print merchandise items and calculate estimated amounts. The printsites 113A and 113B notify the photosite 107 of the estimated amounts.

Step S309:

The photosite 107 stores the estimated amounts from the printsites 113A and 113B in the CBox 170. Upon receiving the estimated amounts from all the printsites, the charge calculation module 111 adds the necessary expense and profit to the sum of the estimated amounts, thereby calculating the charge amount. The photosite 107 notifies the user PC 102 of the charge amount.

Steps S310A and S310B:

When the customer 122 agrees to the charge amount displayed on the user PC 102 and decides to order the print merchandise items, the user PC 102 transfers the recognition ID to the photosite 107 to approve the print orders.

Steps S311A and S311B:

Upon receiving the approval of print orders from the user PC 102, the photosite 107 issues formal print orders to the printsites 113A and 113B.

Steps S312A and S312B:

When the formal print orders from the photosite 107 are accepted, the printsites 113A and 113B return order reception notifications to the photosite 107.

Steps S313A and S313B:

After receiving the order reception notifications from the printsites 113A and 113B, the photosite 107 transfers image data to be used for print processing to the printsites 113A and 113B.

Steps S314A and S314B:

Upon receiving the image data to be used for printing, the printsites 113A and 113B print the image data on the designated merchandise items (New Year's cards or T-shirts) using the printing means 116A and 116B.

The printsites 113A and 113B execute procedures for delivering the print merchandise items 117A and 117B to the customer 122 of the user PC 102.

Steps S315A and S315B:

The printsites 113A and 113B transmit to the photosite 107 "shipment complete notifications" representing that the shipment of the print merchandise items 117A and 117B is ended.

Step S316:

Upon receiving the "shipment complete notifications" from the printsites 113A and 113B, the photosite 107 regards that processing for the print orders placed by the customer 122 is ended and adds up the sales.

Step S317:

The photosite 107 transmits information such as the charge amount and customer recognition ID to the settlement agent site 118 to request the settlement agent site 118 to execute settlement processing for the customer 122 on behalf of the photosite 107.

Step S318:

Upon receiving the request from the photosite 107, the settlement execution module 120 in the settlement agent site 118 executes settlement processing for the customer 122.

As described above, according to this embodiment, even when the customer 122 will give print orders to the plurality of printsites 113, he/she can do it by executing order processing only once. Hence, the labor of the user can be reduced.

In addition, even when print orders are given to plurality of printsites 113, settlement processing can be executed at once. Hence, the commission to be paid to the settlement agent site 118 can be reduced. Furthermore, the security can also be increased because the number of times of transfer of user's personal information to the settlement agent site 118 can be decreased.

Second Embodiment

A system according to the second embodiment of the present invention will be described next with reference to FIGS. 4 and 5.

In this embodiment, a photosite 107 has a timer 172 in a main controller 112. The period until the photosite 107 requests a settlement agent site 118 to execute bill settlement processing for a customer 122 on behalf of the photosite 107 is unitarily managed by the timer 172. Accordingly, even when a user PC 102 gives print orders to a plurality of printsites 113, settlement processing can be executed at once. The remaining components and their operations are the same as in the first embodiment. The same reference numerals as in the first embodiment denote the same components in the second embodiment, and a description thereof will be omitted.

As an example of processing executed by the system of this embodiment, a case wherein the first print order is given to a printsite 113A, and the second print order is given to a printsite 113B will be described with reference to FIG. 4. Referring to FIG. 4, "-n" in a step number indicates that the step is executed in the nth cycle. More specifically, after a step with "-n" is repeated n times, a step without "-n" can be executed once. This also applies to FIG. 5 and subsequent drawings.

Step S401-n:
The user PC 102 places the first print order with the photosite 107. This print order is for the printsite 113A.

Step S402-n:
The photosite 107 issues a temporary print order to the printsite 113A, thereby requesting estimation for the print order received from the user PC 102.

Step S403-n:
An estimate calculation module 115A in the printsite 113A executes estimation requested by the photosite 107 and calculates an estimated amount. The printsite 113A sends the estimated amount to the photosite 107.

Step S404-n:
A charge calculation module 111 in the photosite 107 adds the necessary expense and profit to the estimated amount received from the printsite 113A, thereby calculating the charge amount. The photosite 107 transmits the charge amount to the user PC 102.

Step S405-n:
The user PC 102 displays, on its display, the charge amount transmitted in step S404-n and presents the charge amount to the customer 122. The customer 122 determines on the basis of the presented charge amount whether he/she should decide the print order. When the customer 122 agrees with the charge amount and decides the print order, the user PC 102 notifies the photosite 107 of the approval of print order.

Step S406-n:
Upon receiving the approval of print order from the user PC 102, the photosite 107 issues a formal print order to the printsite 113A.

Step S407-n:
The photosite 107 receives a shipment complete notification for print merchandise 117A from the printsite 113A. The charge amount is stored in a CBox 170 and managed.

In this manner, the value of the charge for the print order given by the customer 122 to the photosite 107 is stored and kept in the CBox 170 during a predetermined period without executing settlement processing.

Similarly, the second and subsequent print orders by the customer 122 are also given by sequentially executing the processes in steps S401 to S407 above.

Step S408:
The timer 172 in the photosite 107 is a module which instructs to execute unprocessed settlement for the customer 122, which is stored in the CBox 170, every period determined by a contract between the customer 122 and the photosite 107 such that, for example, settlement is executed at the end of each month.

The charge calculation module 111 in the photosite 107 totalizes unprocessed charge amounts for the customer 122, which are stored in the CBox 170, in accordance with the instruction from the timer 172.

A settlement request module 123 in the photosite 107 transmits to a settlement agent site 118 the customer attribute information of the customer 122 and the total charge amount, thereby requesting settlement processing on behalf of the photosite 107.

Step S409:
A settlement execution module 120 in the settlement agent site 118 notifies the user PC 102 of the total charge amount to bill the customer 122.

Step S410:
The customer 122 pays the bill to the settlement agent site 118 until the due date.

Step S411:
The settlement agent site 118 pays to the photosite 107 the bill paid by the customer 122.

Step S412:
The photosite 107 pays the settlement agency commission to the settlement agent site 118.

Step S413:
The photosite 107 pays the charges for merchandise to the printsites 113A and 113B.

Step S414:
The printsites 113A and 113B pay introduction charges to the photosite 107.

Figure 5:
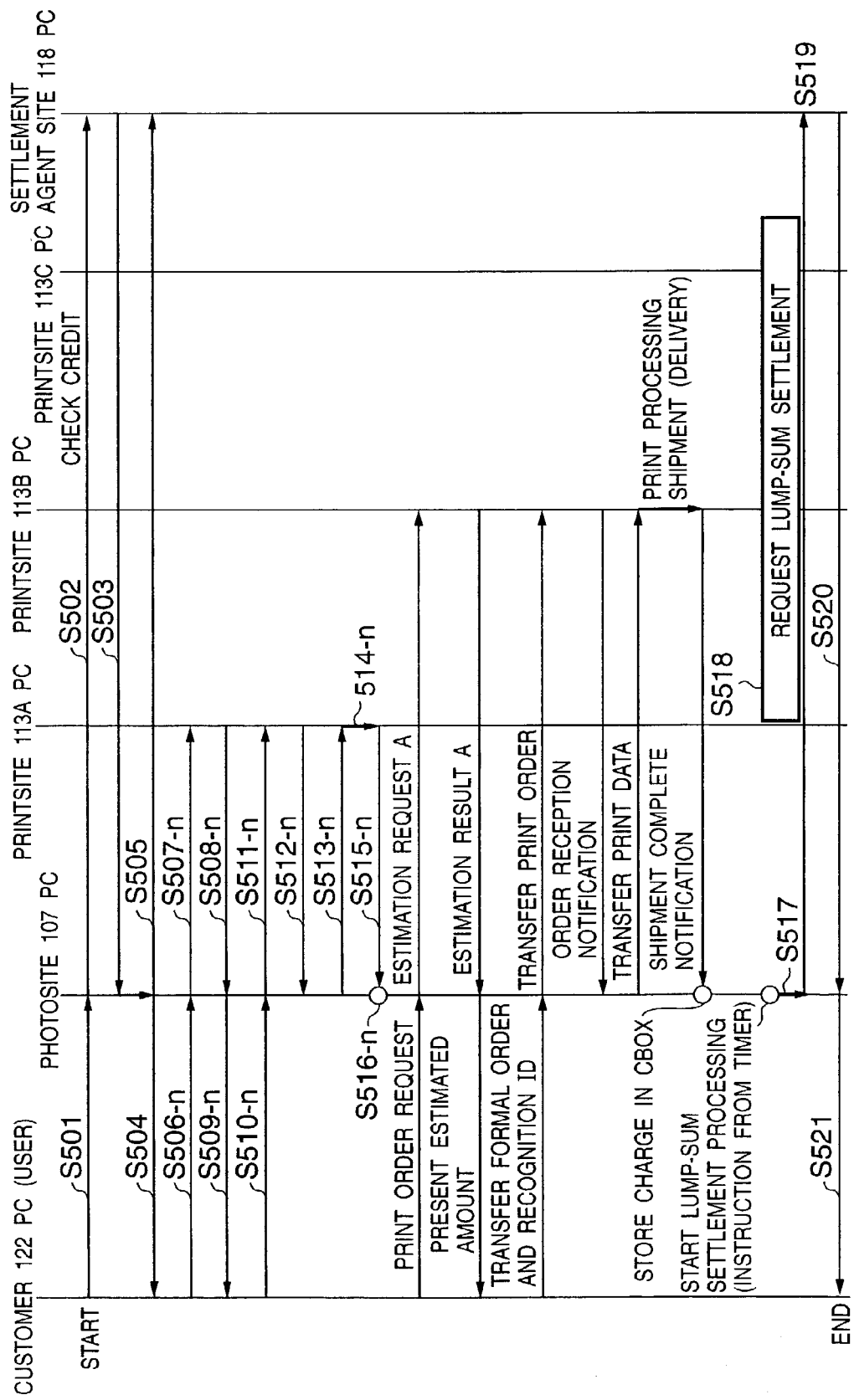
FIG. 5 is a chart showing the processing flow between PCs according to the second embodiment of the present invention.

FIG. 5 is a chart showing the processing flow between the user PC 102, photosite 107, printsites 113, and settlement agent site 118 according to this embodiment.

Step S501:
The user PC 102 transmits to the photosite 107 credit information such as a credit card number necessary for settlement processing together with the personal attribute information of the customer.

Step S502:
The photosite 107 transfers the personal attribute information and credit information of the customer 122 to the settlement agent site 118 and requests the settlement agent site 118 to confirm the credit.

Step S503:
The settlement agent site 118 confirms the solvency of the customer 122 on the basis of the received personal attribute information and credit information of the customer 122 and notifies the photosite 107 of the credit check result.

Step S504:
When notified by the settlement agent site 118 that the customer 122 has solvency, the photosite 107 registers the customer 122 as a user.

The photosite 107 issues a recognition ID to the user PC 102. Then, the customer 122 can use the service of the photosite 107 using the recognition ID.

Step S505:
The photosite 107 also issues a unique customer recognition ID to the settlement agent site 118 such that it can recognize the customer 122. The settlement agent site 118 stores the issued customer recognition ID in a customer DB 119.

Step S506-*n*:

The customer 122 registered in the photosite 107 as a user gives a print order for "New Year's cards" as a print merchandise item to the photosite 107 using the user PC 102.

Step S507-*n*:

The photosite 107 issues a temporary print order to the printsite 113A which handles "New Year's cards", thereby requesting the printsite 113A to estimate the print order from the customer 122.

Step S508-*n*:

The estimate calculation module 115A in the printsite 113A estimates the ordered print merchandise item and calculates an estimated amount. The printsite 113A notifies the photosite 107 of the estimated amount.

Step S509-*n*:

The charge calculation module 111 in the photosite 107 adds the necessary expense and profit to the estimated amount from the printsite 113A, thereby calculating the charge amount. The photosite 107 notifies the user PC 102 of the charge amount.

Step S510-*n*:

When the customer 122 agrees to the charge amount displayed on the user PC 102 and decides to order the print merchandise item, the user PC 102 transfers the recognition ID to the photosite 107 to approve the print order.

Step S511-*n*:

Upon receiving the approval of print order from the user PC 102, the photosite 107 issues a formal print order to the printsite 113A.

Step S512-*n*:

When the formal print order from the photosite 107 is accepted, the printsite 113A returns an order reception notification to the photosite 107.

Step S513-*n*:

After receiving the order reception notification from the printsite 113A, the photosite 107 transfers image data to be used for print processing to the printsite 113A to which the print order is sent.

Step S514-*n*:

Upon receiving the image data to be used for printing, the printsite 113A prints the image data on the designated merchandise item (New Year's cards) using a printing means 116A.

The printsite 113A executes a procedure for delivering the print merchandise item 117A to the customer 122 of the user PC 102. This processing is "shipment (delivery)".

Step S515-*n*:

The printsite 113A transmits to the photosite 107 a "shipment complete notification" representing that the shipment of the print merchandise item is ended.

Step S516-*n*:

Upon receiving the "shipment complete notification" from the printsite 113A, the photosite 107 stores the charge amount in the CBox 170.

Similarly, the second and subsequent print orders by the customer 122 are also given by sequentially executing the processes in steps S506 to S516 above. FIG. 5 shows a case wherein the second print order is given to the printsite 113B.

Step S517:

The charge calculation module 111 in the photosite 107 totalizes unprocessed charge amounts corresponding to the print orders from the customer 122, which are stored in the CBox 170, and adds up the sales in accordance with the instruction from the timer 172.

Step S518:

The settlement request module 123 in the photosite 107 transmits information such as the total charge amount and customer recognition ID to the settlement agent site 118, thereby requesting settlement processing for the customer 122 on behalf of the photosite 107.

Step S519:

The settlement execution module 120 in the settlement agent site 118 executes settlement processing for the customer 122 in accordance with the request from the photosite 107.

Step S520:

When the settlement processing is ended in step S519, the settlement agent site 118 sends a "settlement processing end notification" to the photosite 107.

Step S521:

Upon receiving the "settlement processing end notification" from the settlement agent site 118, the photosite 107 issues a "lump-sum settlement processing complete notification" to the user PC 102 to notify it of the total charge amount paid and the like.

As described above, according to this embodiment, even when the customer 122 gives print orders to the plurality of printsites 113 a plurality of number of times, the settlement processing can be executed at once.

Third Embodiment

A system according to the third embodiment of the present invention will be described next with reference to FIGS. 6 and 7.

In this embodiment, a photosite 107 has a cash limiter (to be referred to as a CLim hereinafter) 173 in a main controller 112. The amount until the photosite 107 requests a settlement agent site 118 to execute bill settlement processing for a customer 122 on behalf of the photosite 107 is unitarily managed by the CLim 173. Accordingly, settlement processing can be executed at once when the amount has reached a predetermined sum according to the solvency of the customer 122. The remaining components and their operations are the same as in the first embodiment. The same reference numerals as in the first embodiment denote the same components in the third embodiment, and a description thereof will be omitted.

As an example of processing executed by the system of this embodiment, a processing flow when the first print order is given to a printsite 113A, and the second print order is given to a printsite 113B will be described with reference to FIG. 6.

Step S601-*n*:

A user PC 102 places the first print order with the photosite 107. This print order is for the printsite 113A.

Step S602-*n*:

The photosite 107 issues a temporary print order to the printsite 113A, thereby requesting estimation.

Step S603-*n*:

An estimate calculation module 115A in the printsite 113A executes estimation and calculates an estimated amount. The printsite 113A sends the estimated amount to the photosite 107.

Step S604-n:

A charge calculation module 111 in the photosite 107 adds the necessary expense and profit to the estimated amount received from the printsite 113A, thereby calculating the charge amount. The photosite 107 transmits the charge amount to the user PC 102.

Step S605-n:

The user PC 102 displays, on its display, the charge amount transmitted in step S404-n and presents the charge amount to the customer 122. The customer 122 determines on the basis of the presented charge amount whether he/she should decide the print order. When the customer 122 decides the print order, the user PC 102 notifies the photosite 107 of the approval of print order.

Step S606-n:

Upon receiving the approval of print order from the user PC 102, the photosite 107 issues a formal print order to the printsite 113A.

Step S607-n:

The photosite 107 receives a shipment complete notification for a print merchandise item A from the printsite 113A. The charge amount is stored in a CBox 170 and managed.

In this manner, the value of the charge for the print order given by the customer 122 to the photosite 107 is stored and kept in the CBox 170 without executing settlement processing until the charge amount reaches the upper limit.

Similarly, the second and subsequent print orders by the customer 122 are also given by sequentially executing the processes in steps S601 to S607 above. FIG. 6 shows a case wherein the second print order is given to the printsite 113B.

Step S608:

The CLim 173 in the photosite 107 is a module which instructs a settlement request module 123 to execute settlement processing for the customer 122, which is stored in the CBox 170, at once on behalf of the photosite 107 when the charge amount has reached an amount determined by a contract between the customer 122 and the photosite 107.

The charge calculation module 111 in the photosite 107 totalizes unprocessed charge amounts for the customer 122, which are stored in the CBox 170. When the charge amount totalized by the charge calculation module 111 has reached the upper limit, the CLim 173 instructs the settlement request module 123 in the photosite 107 to request execution of settlement processing on behalf of the photosite 107. The settlement request module 123 transmits to the settlement agent site 118 the customer attribute information of the customer 122 and the total charge amount.

Step S609:

A settlement execution module 120 in the settlement agent site 118 notifies the user PC 102 of the total charge amount to bill the customer 122.

Step S610:

The customer 122 pays the bill to the settlement agent site 118 until the due date.

Step S611:

The settlement agent site 118 pays to the photosite 107 the bill paid by the customer 122.

Step S612:

The photosite 107 pays the settlement agency commission to the settlement agent site 118.

Step S613:

The photosite 107 pays the charges for merchandise to the printsites 113A and 113B.

Step S614:

The printsites 113A and 113B pay introduction charges to the photosite 107.

Figure 7:
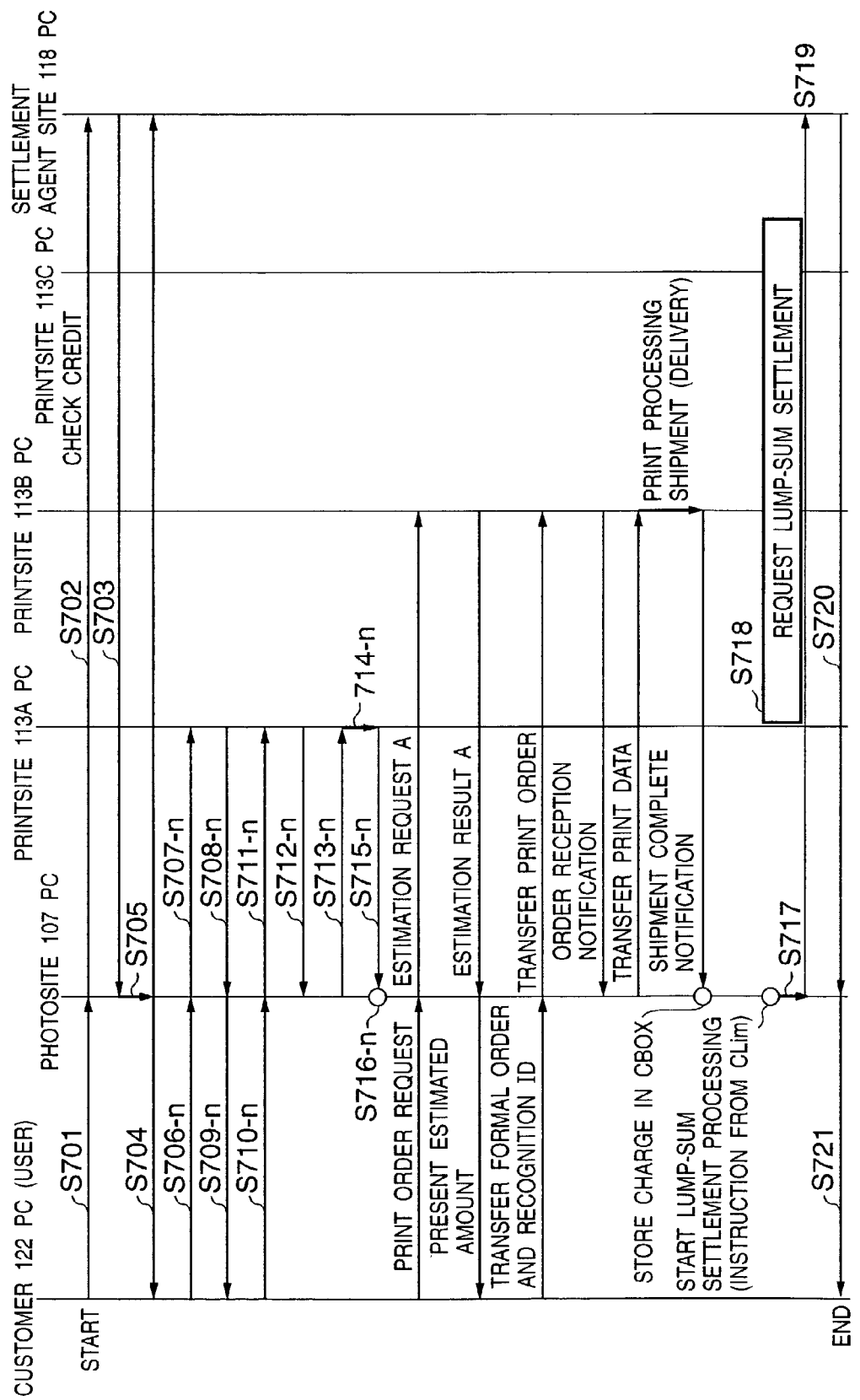
FIG. 7 is a chart showing the processing flow between PCs according to the third embodiment of the present invention.

FIG. 7 is a protocol chart showing the processing flow between the user PC 102, photosite 107, printsites 113, and settlement agent site 118 according to the third embodiment.

Step S701:

The user PC 102 transmits to the photosite 107 credit information such as a credit card number necessary for settlement processing together with the personal attribute information of the customer 122.

Step S702:

The photosite 107 transfers the personal attribute information and credit information of the customer 122 to the settlement agent site 118 and requests the settlement agent site 118 to confirm the credit.

Step S703:

The settlement agent site 118 confirms the solvency of the customer 122 on the basis of the received personal attribute information and credit information of the customer 122 and notifies the photosite 107 of the credit check result.

Step S704:

When notified by the settlement agent site 118 that the customer 122 has solvency, the photosite 107 registers the customer 122 as a user.

The photosite 107 issues a recognition ID to the user PC 102. Then, the customer 122 can use the service of the photosite 107 using the recognition ID.

Step S705:

The photosite 107 also issues a unique customer recognition ID to the settlement agent site 118 such that it can recognize the customer 122. The settlement agent site 118 stores the issued customer recognition ID in a customer DB 119.

Step S706-n:

The customer 122 registered in the photosite 107 as a user gives a print order for "New Year's cards" as a print merchandise item to the photosite 107 using the user PC 102.

Step S707-n:

The photosite 107 issues a temporary print order to the printsite 113A which handles "New Year's cards", thereby requesting the printsite 113A to estimate the print order from the customer 122.

Step S708-n:

The estimate calculation module 115A in the printsite 113A estimates the ordered print merchandise item and calculates an estimated amount. The printsite 113A notifies the photosite 107 of the estimated amount.

Step S709-n:

The charge calculation module 111 in the photosite 107 adds the necessary expense and profit to the estimated amount from the printsite 113A, thereby calculating the charge amount. The photosite 107 notifies the user PC 102 of the charge amount.

Step S710-n:

When the customer 122 agrees to the charge amount displayed on the user PC 102 and decides to order the print merchandise item, the user PC 102 transfers the recognition ID to the photosite 107 to approve the print order.

Step S711-*n*:

Upon receiving the approval of print order from the user PC 102, the photosite 107 issues a formal print order to the printsite 113A.

Step S712-*n*:

When the formal print order from the photosite 107 is accepted, the printsite 113A returns an order reception notification to the photosite 107.

Step S713-*n*:

After receiving the order reception notification from the printsite 113A, the photosite 107 transfers image data to be used for print processing to the printsite 113A to which the print order is sent.

Step S714-*n*:

Upon receiving the image data to be used for printing, the printsite 113A prints the image data on the designated merchandise item (New Year's cards) using a printing means 116A.

The printsite 113A executes a procedure for delivering a print merchandise item 117A to the customer 122 of the user PC 102. This processing is "shipment (delivery)".

Step S715-*n*:

The printsite 113A transmits to the photosite 107 a "shipment complete notification" representing that the shipment of the print merchandise item is ended.

Step S716-*n*:

Upon receiving the "shipment complete notification" from the printsite 113A, the photosite 107 regards that the processing of the print order is ended and stores the charge amount in the CBox 170.

Similarly, the second and subsequent print orders by the customer 122 are also given by sequentially executing the processes in steps S706 to S716 above. FIG. 7 shows a case wherein the second print order is given to the printsite 113B.

Step S717:

The charge calculation module 111 in the photosite 107 totalizes unprocessed charge amounts of the print orders from the customer 122, which are stored in the CBox 170, and adds up the sales. When the charge amount totalized by the charge calculation module 111 has reached a predetermined amount, the CLim 173 instructs the settlement request module 123 to request execution of settlement processing on behalf of the photosite 107.

Step S718:

The settlement request module 123 in the photosite 107 transmits information such as the total charge amount and customer recognition ID to the settlement agent site 118, thereby requesting settlement processing for the customer 122 on behalf of the photosite 107.

Step S719:

The settlement execution module 120 in the settlement agent site 118 executes settlement processing for the customer 122 in accordance with the request from the photosite 107.

Step S720:

When the settlement processing is ended in step S519, the settlement agent site 118 sends a "settlement processing end notification" to the photosite 107.

Step S721:

Upon receiving the "settlement processing end notification" from the settlement agent site 118, the photosite 107 issues a "lump-sum settlement processing complete notification" to the user PC 102 to notify it of the total charge amount paid and the like.

As described above, according to this embodiment, the settlement processing can be executed at once when the amount has reached a predetermined sum according to the solvency of the customer 122.

Fourth Embodiment

A system according to the fourth embodiment of the present invention will be described next with reference to FIGS. 8 and 9.

In this embodiment, a photosite 107 has a page limiter (to be referred to as a PLim hereinafter) 174 in a main controller 112. The number of pages until the photosite 107 requests a settlement agent site 118 to execute bill settlement processing for a customer 122 on behalf of the photosite 107 is unitarily managed by the PLim 174. Accordingly, settlement processing can be executed at once for a predetermined order quantity (number of pages) for the customer 122. The remaining components and their operations are the same as in the first embodiment. The same reference numerals as in the first embodiment denote the same components in the fourth embodiment, and a description thereof will be omitted.

As an example of processing executed by the system of this embodiment, a processing flow when the first print order is given to a printsite 113A, and the second print order is given to a printsite 113B will be described with reference to FIG. 8.

Step S801-*n*:

A user PC 102 places the first print order with the photosite 107. This print order is for the printsite 113A.

Step S802-*n*:

The photosite 107 issues a temporary print order to the printsite 113A, thereby requesting estimation.

Step S803-*n*:

An estimate calculation module 115A in the printsite 113A executes estimation and calculates an estimated amount. The printsite 113A sends the estimated amount to the photosite 107.

Step S804-*n*:

A charge calculation module 111 in the photosite 107 adds the necessary expense and profit to the estimated amount received from the printsite 113A, thereby calculating the charge amount. The photosite 107 transmits the charge amount to the user PC 102.

Step S805-*n*:

The user PC 102 displays, on its display, the charge amount transmitted in step S404-*n* and presents the charge amount to the customer 122. The customer 122 determines on the basis of the presented charge amount whether he/she should place the print order. When the customer 122 decides the print order, the user PC 102 notifies the photosite 107 of the approval of print order.

Step S806-*n*:

Upon receiving the approval of print order from the user PC 102, the photosite 107 issues a formal print order to the printsite 113A.

Step S807-*n*:

The photosite 107 receives a shipment complete notification for a print merchandise item A from the printsite 113A. The charge amount is stored in a CBox 170 and managed.

Similarly, the second and subsequent print orders by the customer 122 are also given by sequentially executing the processes in steps S801 to S807 above. FIG. 8 shows a case wherein the second print order is given to the printsite 113B.

In this manner, the value of the charge for the print order given by the customer 122 to the photosite 107 is stored and kept in the CBox 170 without executing settlement processing until the number of printed pages reaches the upper limit.

Step S808:

The PLim 174 in the photosite 107 is a module which instructs a settlement request module 123 to execute settlement processing for the customer 122, which is stored in the CBox 170, at once on behalf of the photosite 107 when the number of printed pages has reached a value determined by a contract between the customer 122 and the photosite 107.

The PLim 174 totalizes the unprocessed numbers of printed pages for the customer 122, which are stored in the CBox 170. When the number of printed pages totalized by the PLim 174 has reached the upper limit, the charge calculation module 111 in the photosite 107 totalizes the charge amounts stored in the CBox 170. The settlement request module 123 in the photosite 107 transmits to the settlement agent site 118 the customer attribute information of the customer 122 and the total charge amount in accordance with an instruction from the PLim 174 to request the settlement agent site 118 to execute settlement processing on behalf of the photosite 107.

Step S809:

A settlement execution module 120 in the settlement agent site 118 notifies the user PC 102 of the total charge amount to bill the customer 122.

Step S810:

The customer 122 pays the bill to the settlement agent site 118 until the due date.

Step S811:

The settlement agent site 118 pays to the photosite 107 the bill paid by the customer 122.

Step S812:

The photosite 107 pays the settlement agency commission to the settlement agent site 118.

Step S813:

The photosite 107 pays the charges for merchandise to the printsites 113A and 113B.

Step S814:

The printsites 113A and 113B pay introduction charges to the photosite 107.

Figure 9:
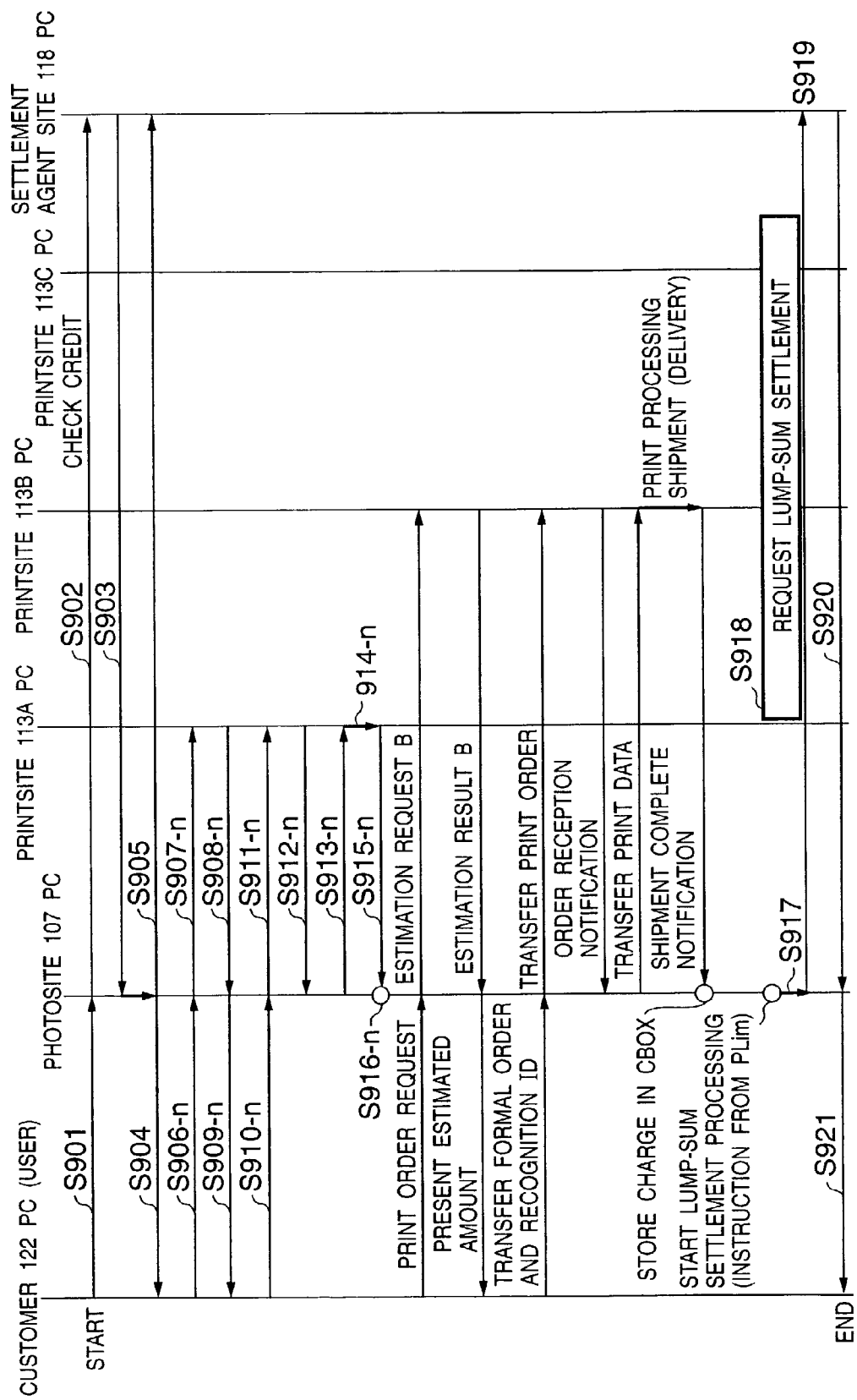
FIG. 9 is a chart showing the processing flow between PCs according to the fourth embodiment of the present invention.

FIG. 9 is a chart showing the processing flow between the user PC 102, photosite 107, printsites 113, and settlement agent site 118 according to this embodiment.

Step S901:

The user PC 102 transmits to the photosite 107 credit information such as a credit card number necessary for settlement processing together with the personal attribute information of the customer 122.

Step S902:

The photosite 107 transfers the personal attribute information and credit information of the customer 122 to the settlement agent site 118 and requests the settlement agent site 118 to confirm the credit.

Step S903:

The settlement agent site 118 confirms the solvency of the customer 122 on the basis of the received personal attribute information and credit information of the customer 122 and notifies the photosite 107 of the credit check result.

Step S904:

When notified by the settlement agent site 118 that the customer 122 has solvency, the photosite 107 registers the customer 122 as a user.

The photosite 107 issues a recognition ID to the user PC 102. Then, the customer 122 can use the service of the photosite 107 using the recognition ID.

Step S905:

The photosite 107 also issues a unique customer recognition ID to the settlement agent site 118 such that it can recognize the customer 122. The settlement agent site 118 stores the issued customer recognition ID in a customer DB 119.

Step S906-*n*:

The customer 122 registered in the photosite 107 as a user gives a print order for "New Year's cards" as a print merchandise item to the photosite 107 using the user PC 102.

Step S907-*n*:

The photosite 107 issues a temporary print order to the printsite 113A which handles "New Year's cards", thereby requesting the printsite 113A to estimate the print order.

Step S908-*n*:

The estimate calculation module 115A in the printsite 113A estimates the ordered print merchandise item and calculates an estimated amount. The printsite 113A notifies the photosite 107 of the estimated amount.

Step S909-*n*:

The charge calculation module 111 in the photosite 107 adds the necessary expense and profit to the estimated amount from the printsite 113A, thereby calculating the charge amount. The photosite 107 notifies the user PC 102 of the charge amount.

Step S910-*n*:

When the customer 122 agrees to the charge amount displayed on the user PC 102 and decides the print order, the user PC 102 transfers the recognition ID to the photosite 107 to approve the print order.

Step S911-*n*:

Upon receiving the approval of print order from the user PC 102, the photosite 107 issues a formal print order to the printsite 113A.

Step S912-*n*:

When the formal print order from the photosite 107 is accepted, the printsite 113A returns an order reception notification to the photosite 107.

Step S913-*n*:

After receiving the order reception notification from the printsite 113A, the photosite 107 transfers image data to be used for print processing to the printsite 113A to which the print order is sent.

Step S914-*n*:

Upon receiving the image data to be used for printing, the printsite 113A prints the image data on the designated merchandise item (New Year's cards) using a printing means 116A.

The printsite 113A executes a procedure for delivering a print merchandise item 117A to the customer 122 of the user PC 102. This processing is "shipment (delivery)".

Step S915-n:

The printsite 113A transmits to the photosite 107 a "shipment complete notification" representing that the shipment of the print merchandise item is ended.

Step S916-n:

Upon receiving the "shipment complete notification" from the printsite 113A, the photosite 107 regards that the processing of the print order is ended and stores the charge amount in the CBox 170.

Similarly, the second and subsequent print orders by the customer 122 are also given by sequentially executing the processes in steps S906 to S916 above. FIG. 9 shows a case wherein the second print order is given to the printsite 113B.

Step S917:

When the number of printed pages of the print orders from the customer 122 has reached a predetermined value, the charge calculation module 111 in the photosite 107 totalizes the unprocessed charge amounts for the customer 122, which are stored in the CBox 170, and adds up the sales in accordance with an instruction from the PLim 174.

Step S918:

The settlement request module 123 in the photosite 107 transmits information such as the total charge amount and customer recognition ID to the settlement agent site 118, thereby requesting settlement processing for the customer 122 on behalf of the photosite 107.

Step S919:

The settlement execution module 120 in the settlement agent site 118 executes settlement processing for the customer 122 in accordance with the request from the photosite 107.

Step S920:

When the settlement processing is ended in step S519, the settlement agent site 118 sends a "settlement processing end notification" to the photosite 107.

Step S921:

Upon receiving the "settlement processing end notification" from the settlement agent site 118, the photosite 107 issues a "lump-sum settlement processing complete notification" to the user PC 102 to notify it of the total charge amount paid and the like.

As described above, according to this embodiment, the settlement processing can be executed at once on the basis of the order quantity (number of pages) of print orders by the customer 122.

Other Embodiment

A system formed by arbitrarily combining some of the first to fourth embodiments is also incorporated in the present invention. For example, the main controller 112 may have the shopping cart 171 and timer 172 to be able to execute both the processes shown in FIGS. 5 and 7.

In addition, in the above embodiments, charges calculated at the printsite are totalized at the photosite. However, the present invention is not limited to this, and the charges may be totalized in the printsite.

The object of the present invention is achieved even by supplying a storage medium (or recording medium) which stores software program for implementing the functions of the above-described embodiments to a system or apparatus and causing the computer (or a CPU or MPU) of the system or apparatus to read out and execute the program codes stored in the storage medium. In this case, the program codes read out from the storage medium implements the functions of the above-described embodiments by themselves, and the storage medium which stores the program codes constitutes the present invention. The functions of the above embodiments are realized not only when the readout program codes are executed by the computer but also when the OS (Operating System) or the like running on the computer performs part or all of actual processing on the basis of the instructions of the program codes.

The functions of the above embodiments are also realized when the program codes read out from the storage medium are written in the memory of a function expansion board inserted into the computer or a function expansion unit connected to the computer, and the CPU of the function expansion board or function expansion unit or the like performs part or all of actual processing on the basis of the instructions of the program codes.

Figure 4:
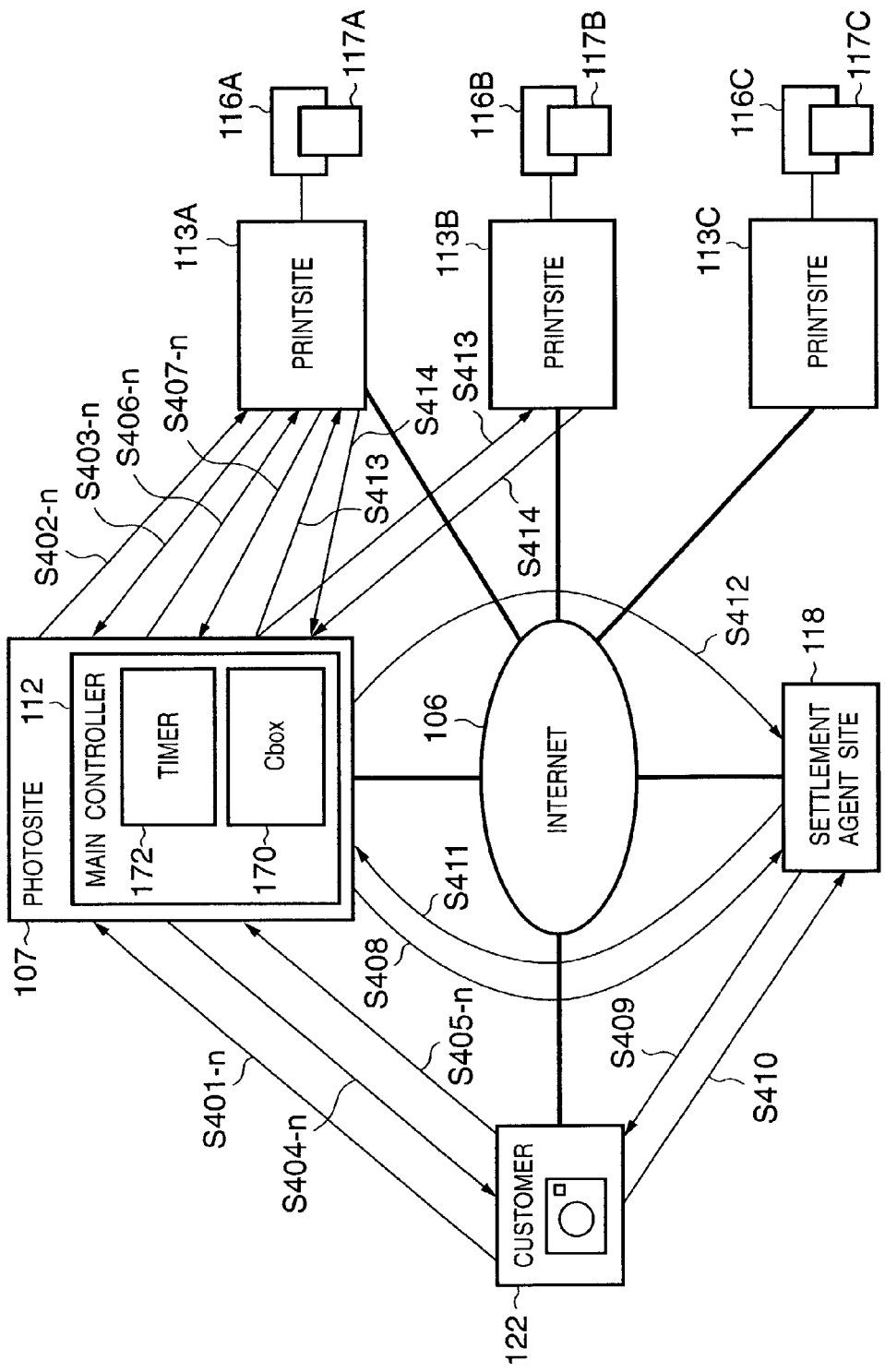
FIG. 4 is a block diagram showing the processing flow in the second embodiment of the present invention.
Figure 6:
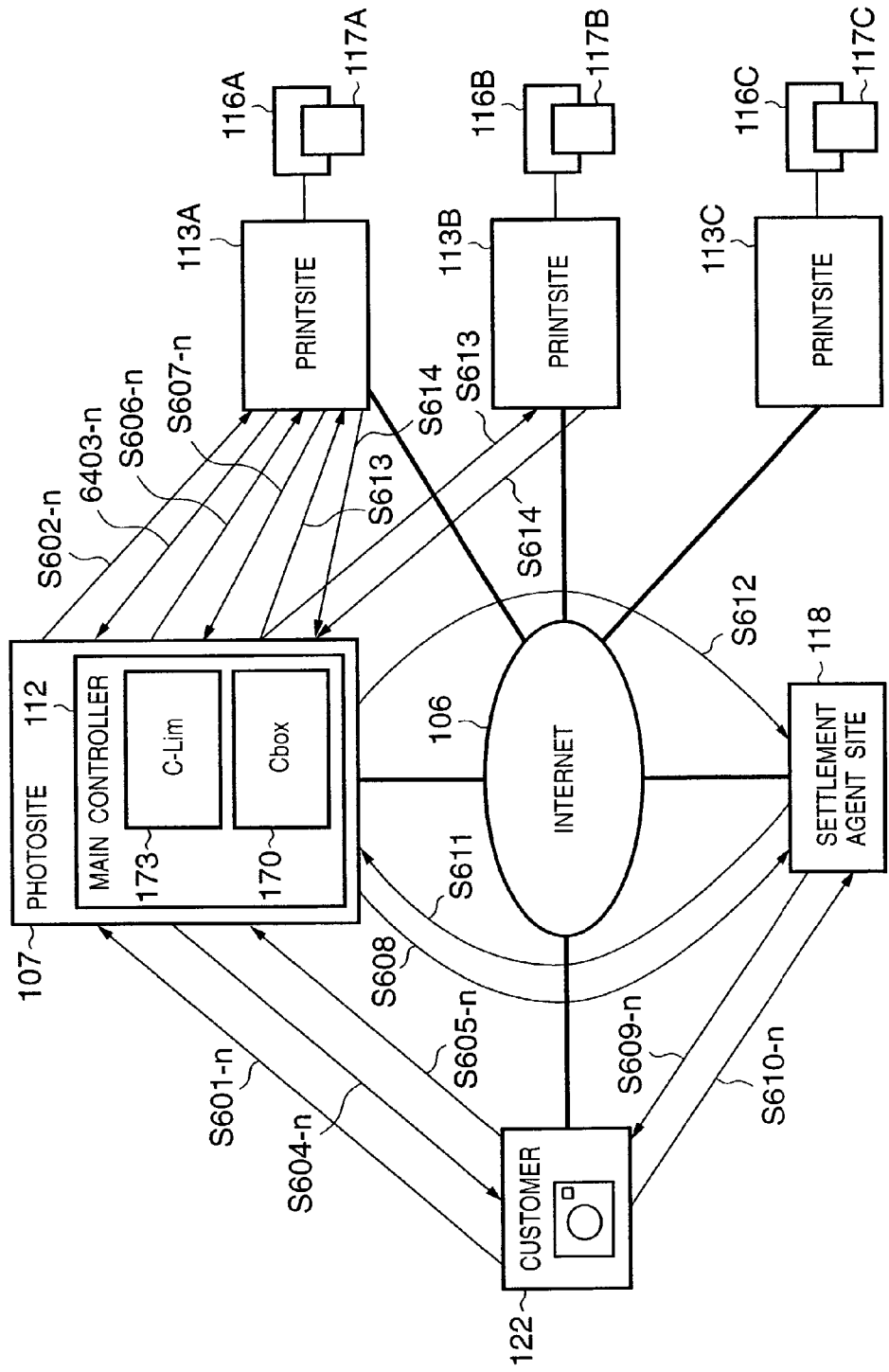
FIG. 6 is a block diagram showing the processing flow in the third embodiment of the present invention.
Figure 8:
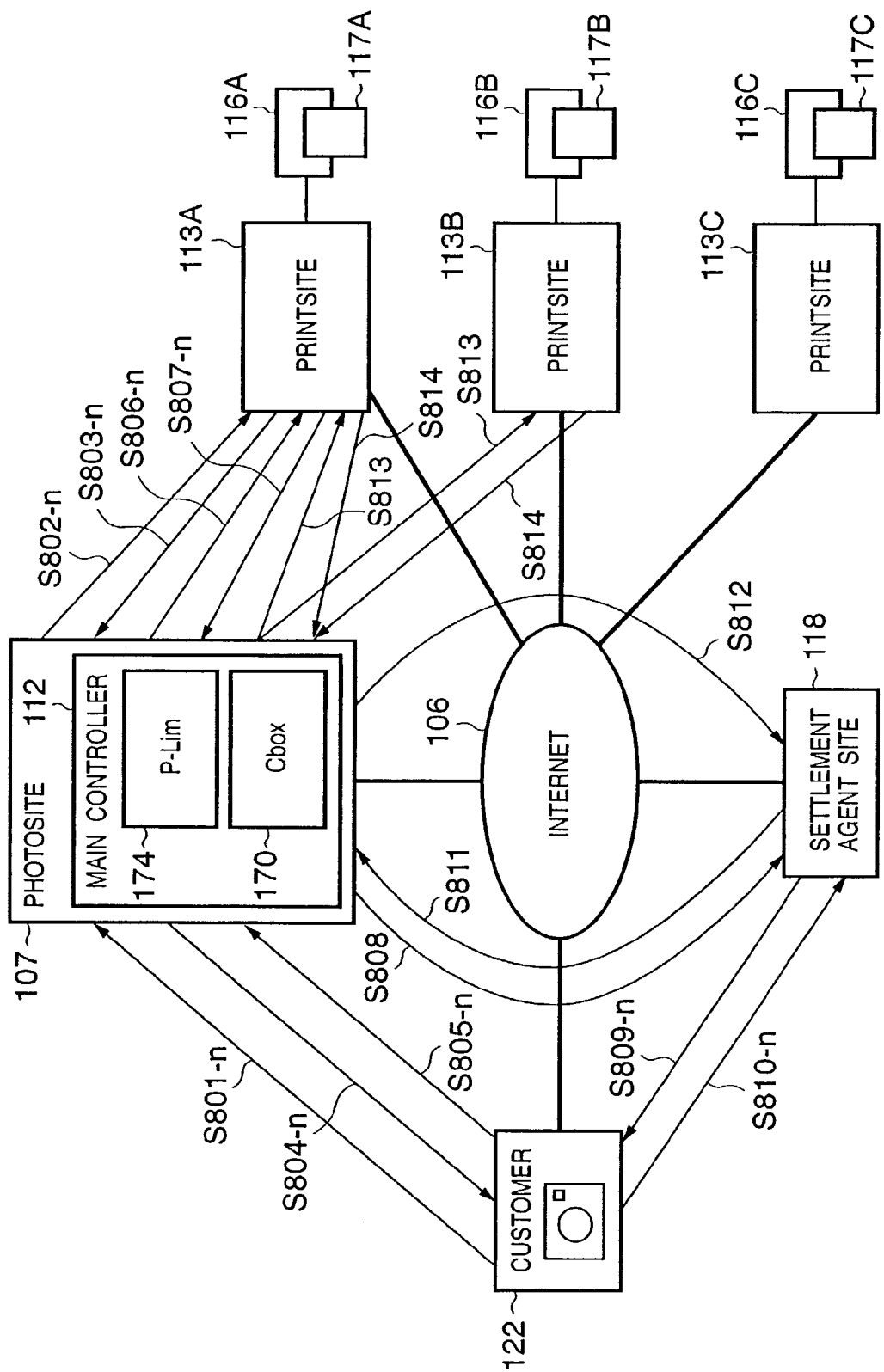
FIG. 8 is a block diagram showing the processing flow in the fourth embodiment of the present invention.

When the present invention is applied to the above storage medium, the storage medium stores program codes for implementing the processing flow shown in FIG. 4, 6, or 8.

According to the present invention, an information providing system which can execute settlement processing for user's orders all at once, an information processing apparatus, a control method therefor, a control program, and a storage medium can be provided.

As many apparently widely different embodiments of the present invention can be made without departing from the spirit and scope thereof, it is to be understood that the invention is not limited to the specific embodiments thereof except as defined in the appended claims.

What is claimed is:

1. An information providing system on a network including an order accepting apparatus which receives image data from a customer terminal, stores the received image data and accepts a plurality of orders to print the stored image data from the customer terminal, and a plurality of printing apparatuses which print the ordered image data, at least one of said printing apparatuses being specified in each of the plurality of orders by the customer terminal, wherein each of said printing apparatuses comprises:
  accepting means for accepting, from the order accepting apparatus, a temporary order to print the image data;
  calculation means for calculating a charge amount to be paid in exchange for printing the image data on print media in accordance with the temporary order accepted by said accepting means; and
  notification means for notifying said order accepting apparatus of the charge amount calculated by said calculation means, and wherein said order accepting apparatus comprises:
  order accepting means for accepting, from the customer terminal, the plurality of orders in each of which at least one of said printing apparatuses is specified by the customer terminal;
  transfer means for transferring temporary orders corresponding to each of the plurality of orders accepted by the order accepting means to the at least one of said printing apparatuses specified in the respective order;
  reception means for receiving a plurality of calculated charge amounts from said notification means of each of the plurality of printing apparatuses to which the temporary orders are transferred by the transfer means;
  totaling means for totaling the plurality of calculated charge amounts received by said reception means to obtain a total charge amount;
  total charge transmission means for transmitting the total charge amount to the customer terminal;

order approval reception means for receiving, from the customer terminal, a notification indicating approval of the order to print the image data;

formal print order issuing means for issuing formal print orders to each of the plurality of printing apparatuses specified in the respective order to print the image data;

counting means for counting a number of print media which are printed according to the formal orders; and settlement request means for requesting, to a settlement apparatus, settlement of the total charge resulting from totaling by said totaling means, when the counted number of print media exceeds a predetermined number.

2. The system according to claim 1, wherein when an accepted order indicates printing of the stored image data on plural kinds of print medium, said transfer means transfer the temporary orders to respective printing apparatuses corresponding to each of the plural kinds of print medium.

3. The system according to claim 1, wherein said totaling means totals the calculated charge amounts after all of the calculated charge amounts have been received by said reception means.

4. The system according to claim 1, wherein said settlement request means further requests settlement when the total charge has reached a predetermined charge amount.

5. The system according to claim 1, wherein the order accepting apparatus further comprises providing means for providing the customer terminal with an input screen on which the orders are input.

6. An order accepting apparatus which receives image data from a customer terminal and stores the received image data, comprising:

order accepting means for accepting, from the customer terminal, a plurality of orders to print the stored image data on print media, each order including at least one of a plurality of printing apparatuses specified by the customer terminal which are to print the ordered image data;

transfer means for transferring temporary orders corresponding to each of the plurality of orders accepted by the order accepting means to the at least one of said printing apparatuses specified in the respective order;

reception means for receiving, from each of said plurality of printing apparatuses, charge amounts to be paid in exchange for printing the image data on the print media, each charge amount being calculated by each of the printing apparatuses, respectively, in accordance with the temporary orders transferred by said transfer means;

totaling means for totaling the calculated charge amounts received by said reception means to obtain a total charge amount;

total charge transmission means for transmitting the total charge amount to the customer terminal;

order approval reception means for receiving, from the customer terminal, a notification indicating approval of the order to print the image data;

formal print order issuing means for issuing formal print orders to each of the plurality of printing apparatuses specified in the respective order to print the image data;

counting means for counting a number of print media which are printed according to the formal orders; and settlement request means for requesting, to a settlement apparatus, settlement of the total charge amount resulting from the totaling by said totaling means, when the counted number of print media exceeds a predetermined number.

7. The apparatus according to claim 6, wherein when an accepted order indicates printing of the stored image data on plural kinds of print medium, said transfer means transfers the temporary orders to respective printing apparatuses corresponding to each of the plural kinds of print medium.

8. The apparatus according to claim 6, further comprising providing means for providing the customer terminal with an input screen on which the orders are input, wherein said accepting means accepts orders input on the input screen.

9. The apparatus according to claim 6, wherein said totaling means totals the calculated charge amounts received by said reception means after all of the calculated charge amounts have been received.

10. The apparatus according to claim 6, wherein said settlement request means further requests settlement when the total charge has reached a predetermined charge amount.

11. A control method for an order accepting apparatus which receives image data from a customer terminal and stores the received image data, comprising:

an order accepting step of accepting, from the customer terminal, a plurality of orders to print the stored image data on print media, each order including at least one of a plurality of printing apparatuses specified by the customer terminal which are to print the ordered image data;

a transfer step of transferring temporary orders corresponding to each of the plurality of orders accepted by the order accepting step to the at least one of said printing apparatuses specified in the respective order;

a reception step of receiving, from each of the plurality of printing apparatuses, calculated charge amounts to be paid in exchange for printing the image data on the print media, each calculated charge amount being calculated by each of the printing apparatuses, respectively, in accordance with the temporary orders transferred in the transfer step;

a totaling step of totaling the calculated charge amounts received in the reception step to obtain a total charge amount;

a total charge transmission step of transmitting the total charge amount to the customer terminal;

an order approval reception step of receiving, from the customer terminal, a notification indicating approval of the order to print the image data;

a formal print order issuing step of issuing formal print orders to each of the plurality of printing apparatuses specified in the respective order to print the image data;

a counting step of counting a number of print media which are printed according to the formal orders; and a settlement request step of requesting, to a settlement apparatus, settlement of the total charge amount resulting from the totaling by the totaling step, when the counted number of print media exceeds a predetermined number.

12. A computer readable storage medium on which is stored a program for causing a computer to execute a method for an order accepting apparatus which receives image data from a customer terminal and stores the received image data, the program comprising:

an order accepting step of accepting, from the customer terminal, a plurality of orders to print the stored image data on print media, each order including at least one of a plurality of printing apparatuses specified by the customer terminal which are to print the ordered image data;

a transfer step of transferring temporary orders corresponding to each of the plurality of orders accepted in the order accepting step to the at least one of said printing apparatuses specified in the respective order;

a reception step of receiving, from each of the plurality of printing apparatuses, calculated charge amounts to be paid in exchange for printing the image data on the print media, each charge amount being calculated by each of the printing apparatuses, respectively, in accordance with the temporary orders transferred in the transfer step;

a totaling step of totaling the calculated charge amounts received in the reception step to obtain a total charge amount;

a total charge transmission step of transmitting the total charge amount to the customer terminal;

an order approval reception step of receiving, from the customer terminal, a notification indicating approval of the order to print the image data;

a formal print order issuing step of issuing formal print orders to each of the plurality of printing apparatuses specified in the respective order to print the image data;

a counting step of counting a number of print media which are printed according to the formal orders; and a settlement request step of requesting settlement, to a settlement apparatus, of the total charge amount resulting from the totaling in the totaling step, when the counted number of print media exceeds a predetermined number.

* * * * *